(12) United States Patent
Rickling et al.

(10) Patent No.: US 9,103,407 B2
(45) Date of Patent: *Aug. 11, 2015

(54) DISK SET ARRANGEMENT FOR A CHAIN-TYPE CVT

(75) Inventors: Nicolas Rickling, Offendorf (FR); Peter Schmid, Teningen (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 580 days.

This patent is subject to a terminal disclaimer.

(21) Appl. No.: 13/416,213

(22) Filed: Mar. 9, 2012

(65) Prior Publication Data

US 2012/0172161 A1 Jul. 5, 2012

Related U.S. Application Data

(63) Continuation of application No. PCT/DE2010/000991, filed on Aug. 26, 2010.

(30) Foreign Application Priority Data

Sep. 10, 2009 (DE) .......................... 10 2009 041 071

(51) Int. Cl.
*F16H 55/56* (2006.01)
*F16G 5/18* (2006.01)
*F16H 9/12* (2006.01)

(52) U.S. Cl.
CPC *F16G 5/18* (2013.01); *F16H 9/125* (2013.01); *F16H 55/56* (2013.01)

(58) Field of Classification Search
USPC .................................................. 474/8, 18, 28
See application file for complete search history.

(56) References Cited

U.S. PATENT DOCUMENTS 5,328,412 A * 7/1994 Durum .............................. 474/8
7,431,674 B2 * 10/2008 Van Der Leest et al. ......... 474/8

FOREIGN PATENT DOCUMENTS

| CN | 1678844 A | 10/2005 |
| CN | 1754052 A | 3/2006 |
| DE | 3447092 A1 | 7/1986 |
| DE | 100 18 243 A1 | 10/2000 |
| DE | 10 2005 037 941 A1 | 3/2006 |
| EP | 1 441 151 A2 | 7/2004 |
| EP | 1564441 A1 | 8/2005 |

* cited by examiner

*Primary Examiner* — Sang Kim
*Assistant Examiner* — Juan Campos, Jr.
(74) *Attorney, Agent, or Firm* — Lucas & Mercanti, LLP

(57) ABSTRACT

The invention relates to a disk set arrangement with a driving disk set and a driven disk set for a chain-type CVT, wherein each disk set of said arrangement comprises two disks that are axially displaceable relative to one another on a shaft and a chain arrangement comprising thrust pieces that are active between said disks. The longitudinal axis of said thrust pieces runs parallel to the rotational axis of the shaft, and the frictional surfaces of the disks and the thrust pieces have a curvature determined by a radius and an eccentricity, wherein the eccentricity of the disk in the driving disk set is different to that of the driven disk set.

10 Claims, 2 Drawing Sheets

DISK SET ARRANGEMENT FOR A CHAIN-TYPE CVT

CROSS-REFERENCE TO RELATED APPLICATIONS

This application is a continuation of PCT/DE2010/000991 filed Aug. 26, 2010, which in turn claims the priority of DE 10 2009 041 071.6 filed Nov. 10, 2009. The priority of these applications is hereby claimed and these applications are incorporated by reference herein

FIELD OF THE INVENTION

The present invention relates to a disk set arrangement, which has a drive input disk set and a drive output disk set for a chain-type CVT (Continuously Variable Transmission).

BACKGROUND OF THE INVENTION

DE 10 2005 037 941A1 discloses a conical-disk wraparound transmission which has substantially a drive-input-side and a drive-output-side disk set. Each disk set has a fixed disk and a moving disk. The disks are arranged respectively on a drive-input-side and a drive-output-side shaft and are connected to one another for a transmission of torque by a chain arrangement.

DE 3447092 A1 discloses a conical-disk wraparound transmission with continuously variable transmission ratio, in which the friction surfaces of the conical disks and the end surfaces of the thrust pieces of a chain arrangement have an arcuate convexity directed toward one another. In said conical-disk wraparound transmission, the disks of a disk set have the same convexity, which is defined by a radius and if appropriate an eccentricity of the central point of the radius in an axial section through the disks. The end surfaces of the cradle thrust pieces have a convexity in the radial direction and if appropriate also in the azimuthal direction.

In the prior art, use is presently made of chains with a radial angle of 10.1° and chains with a radial angle of 9.7°. Both variants of the cradle thrust pieces of a plate link chain are used with curved disks with a radius of curvature of 5000 mm and an eccentricity of 760 mm. Tangential angles relative to the perpendicular of between approximately 9° and 9.8° arise over the operating range of the disk pairs.

While the 10.1° chain runs acoustically more quietly than the 9.7° chain during operation, the 10.1° chain exhibits a greater degree of wear than the 9.7° chain. The 9.7° chain is wear-optimized relative to the 1.0.1° chain, whereas the 10.1° chain is acoustically optimized relative to the 9.7° chain.

SUMMARY OF THE INVENTION

It is therefore an object of the present invention to specify an optimum with regard to wear and acoustic behavior during operation when using plate link chain cradle thrust pieces known per se.

As such, the present invention relates to a disk set arrangement, which has a drive input disk set and a drive output disk set for a chain-type CVI. The disk sets of the disk set arrangement comprise two disks, which are movable axially relative to one another on a shaft and a chain arrangement with cradle thrust pieces which act between said disks. The longitudinal axis of the cradle thrust pieces runs parallel to the axis of rotation of the shaft. Friction surfaces of the disks with the cradle thrust pieces have a curvature defined by a radius and an eccentricity. The eccentricity of the disks in the drive input disk set and drive output disk set differs.

In one embodiment, the curvature of the disks of at least one of the disk sets is defined by a ratio between the eccentricity of the disk curvature and the disk set radius, which ratio lies in a range from 0.145 to 0.20. The eccentricity of the disk curvature is defined by a point which is remote from the axis of rotation of the disks by a first distance running perpendicular to the axis of rotation of the disks and from which the disk set radius which determines the curvature of the sides, which face one another, of the disks is measured. The disk set radius intersects the axis of rotation.

In another embodiment, the curvature of the cradle thrust pieces is defined by a first ratio between a first eccentricity of the cradle thrust pieces and a first cradle thrust piece radius. The first ratio lies in a range from 0.165 to 0.185. The first cradle thrust piece radius is measured from a first point which is remote from the longitudinal axis of the cradle thrust pieces by a first distance running perpendicular to the longitudinal axis, and by a second ratio, which is defined between a second eccentricity of the cradle thrust pieces and a second cradle thrust piece radius in the azimuthal direction; the second ratio lies in a range from 0 to 0.015. The second cradle thrust piece radius is measured from a second point, which is remote from the longitudinal axis by a distance corresponding to the second eccentricity of the cradle thrust pieces, which runs perpendicular to the longitudinal axis and perpendicular to the first distance.

In a further embodiment, the first eccentricity is approximately 35 mm and the first thrust piece radius is approximately 200 mm.

In yet another embodiment, the second eccentricity is approximately 0.42 mm and the second thrust piece radius is approximately 80 mm.

In an even further embodiment, the curvature of the cradle thrust pieces is defined by a first ratio between a first eccentricity of the cradle thrust pieces and a first cradle thrust piece radius. The first ratio lies in a range from 0.159 to (1179. The first cradle thrust piece radius is measured from a first point which is remote from the longitudinal axis of the cradle thrust pieces by a first distance running perpendicular to the longitudinal axis, and by a second ratio, which is defined between a second eccentricity of the cradle thrust pieces and a second cradle thrust piece radius in the azimuthal direction; the second ratio lies in a range from 0 to 0.015. The second cradle thrust piece radius is measured from a second point, which is remote from the longitudinal axis, by a distance corresponding to the second eccentricity of the cradle thrust pieces, which runs perpendicular to the longitudinal axis and perpendicular to the first distance.

In another embodiment, the first eccentricity is approximately 33.7 mm and the first cradle piece radius is approximately 200 mm.

In yet another embodiment, the second eccentricity is approximately 0.42 mm and the second cradle piece radius is approximately 80 mm.

In a further embodiment, the eccentricity of the disk curvature of one disk lies in a range from 755 mm to 765 mm and the eccentricity of the disk curvature of the other disk lies in a range from 790 mm to 800 mm.

In another embodiment, the eccentricity of the disk curvature of one disk lies in a range from 755 mm to 765 mm and the eccentricity of the disk curvature of the other disk lies in a range from 720 mm to 730 mm.

In an even further embodiment, the disk set radius is between 4000 mm and 6000 mm.

In another embodiment, the disk set radius is 5000 mm.

In yet another embodiment, the disk set comprises a fixed disk and a movable disk.

In a further embodiment, this comprises a disk set arrangement.

BRIEF DESCRIPTION OF THE DRAWINGS

Exemplary embodiments of the invention will be explained in more detail below on the basis of the figures, in which.

DETAILED DESCRIPTION OF THE INVENTION

Figure 3:
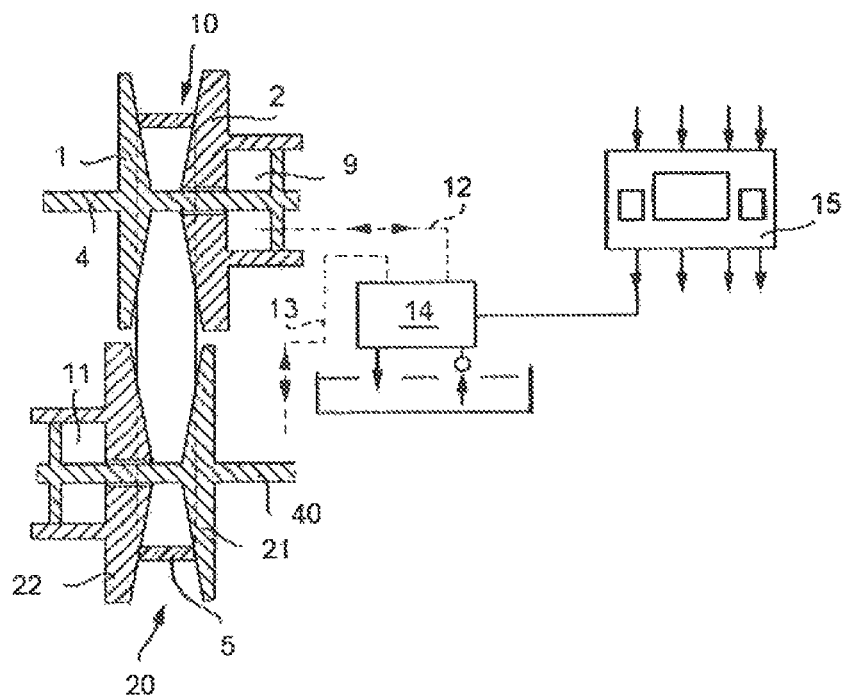
FIG. 3 is a schematic diagrammatic illustration of a known conical-disk wraparound transmission with associated control device.

For better understanding of the invention and to clarify the expressions used, a conical-disk wraparound transmission (chain-type CVT) according to the prior art will be explained on the basis of FIG. 3. The chain-type CVT has two conical disk pairs, specifically a drive input disk set 10 and a drive output disk set 20. A fixed disk 1 of the drive input disk set 10 is rigidly connected to a drive input shaft 4, which is driven for example by an internal combustion engine. A fixed disk 21 of the other conical disk pair, specifically the drive output disk set 20, is rigidly connected to a drive output shaft 40 which drives the vehicle. The other conical disk, specifically a movable disk 2 of the drive input disk set 10, is connected in a rotationally conjoint but axially movable manner to the drive input shaft 4. The other conical disk 22 of the drive output disk set 20 is connected in a rotationally conjoint and axially movable manner to the drive output shaft 40. Around the two disk sets 10 and 20 there runs a wraparound means, for example a chain arrangement 5, which is in frictional engagement with the conical surfaces, which face toward one another, of the conical disks. By adjusting the axial spacing between the two conical disks of each conical disk pair, it is possible to vary the rotational speed ratio between the two conical disk pairs, and therefore the transmission ratio of the transmission. The transmission ratio adjustment is effected for example by means of pressure chambers 9 and 11 which are connected via hydraulic lines 12 and 13 to a control valve unit 14, by means of which the charging of the pressure chambers 9 and 11 with hydraulic medium pressure for the purpose of transmission ratio adjustment can be controlled. The control valve unit 14 is actuated by means of a control unit 15 which comprises a microprocessor with associated memory devices, and the inputs of which are connected for example to a selector lever unit for actuating the transmission, to an accelerator pedal, to rotational speed sensors and the like, and the outputs of which are connected for example to a clutch, to a power control element of the engine (not illustrated) and to the control valve unit 14. The design and function of a conical-disk wraparound transmission are known per se and therefore will not be explained in any more detail.

Figure 1:
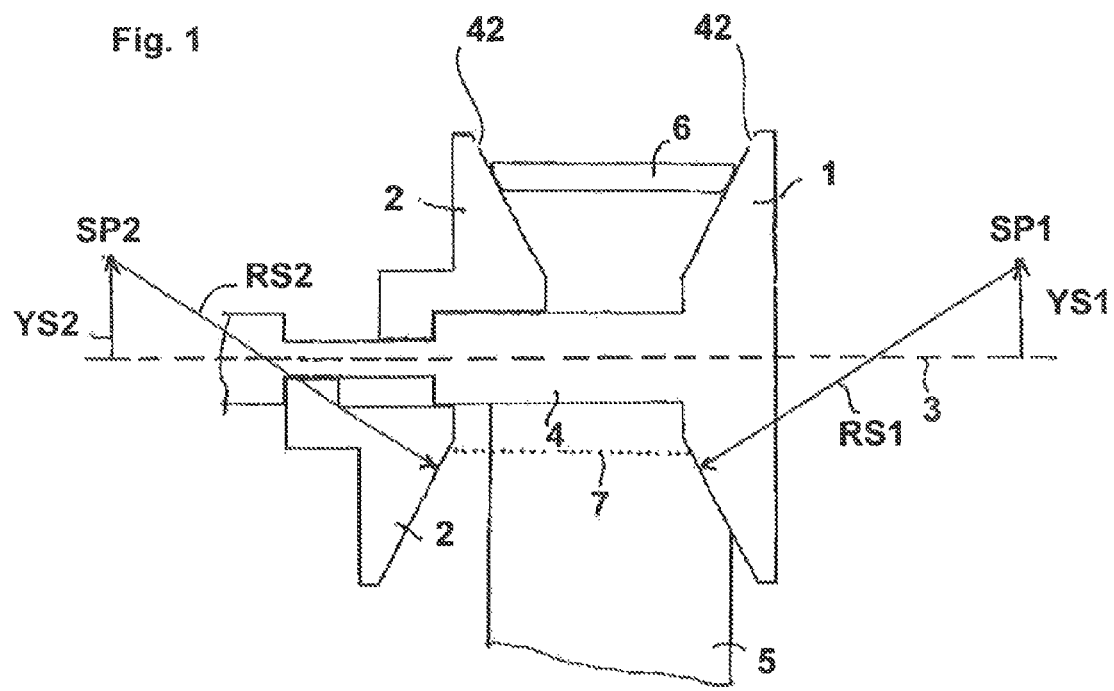
FIG. 1 is a schematic illustration of a drive input disk set for explaining the contours of the disks.

FIG. 1 is a schematic illustration of a drive input disk set with a functionally optimized contour for a chain-type CVT (Continuously Variable Transmission), which drive input disk set has substantially a fixed disk 1 and a movable disk 2, wherein in FIG. 1, above the axis of rotation 3 of the shaft 4, the movable disk 2 is arranged in the position in which it is closest to the fixed disk 2, and below the axis of rotation 3 of the shaft 4, the movable disk 2 is arranged in the position in which it is furthest remote from the fixed disk 1. The chain arrangement shown between the fixed disk 1 and the movable disk 2 is denoted by 5. Here, the cross-sectional illustration shows in particular a cradle thrust piece 6 of the chain arrangement 5.

In the position of the movable disk 2 illustrated above the axis of rotation 3 of the shaft 4, the cradle thrust pieces 6 are situated in the overdrive position, whereas the dotted line 7 below the axis of rotation 3 of the shaft 4 then shows the position of the cradle thrust pieces 6 in the underdrive position.

The disk set arrangement as described up to this point is known.

The present invention concerns the physical disk contour of the fixed disk 1 and of the movable disk 2 of the disk set, and the contour, adapted thereto, of the cradle thrust pieces 6 of the chain arrangement 5.

The fixed disk 1 has a disk contour such that friction surfaces 42 with the cradle thrust pieces 6 are of convex design, that is to say have a radius in a sectional illustration as in FIG. 1. In the case of the fixed disk 1, said radius is denoted by RS1, and in the case of the movable disk 2, said radius is denoted by RS2. The central point of the radius for an arbitrary azimuthal section through the disks 2 is offset from the axis of rotation 3 by an eccentricity YS1 for the fixed disk 1 and YS2 for the movable disk 2. The radii RS1 and RS2 and the eccentricities YS1 and YS2 may be in each case identical or different. The disk set radius of the fixed disk 1 is measured from a point SP1 which is remote from the axis of rotation 3 by a distance which corresponds to the eccentricity YS1 and which is measured perpendicular to the axis of rotation 3. Correspondingly, the disk set radius of the movable disk 2 is measured from a point SP2, which is remote from the axis of rotation 3 by a distance which corresponds to the eccentricity YS2 and which is measured perpendicular to the axis of rotation 3.

Figure 2:
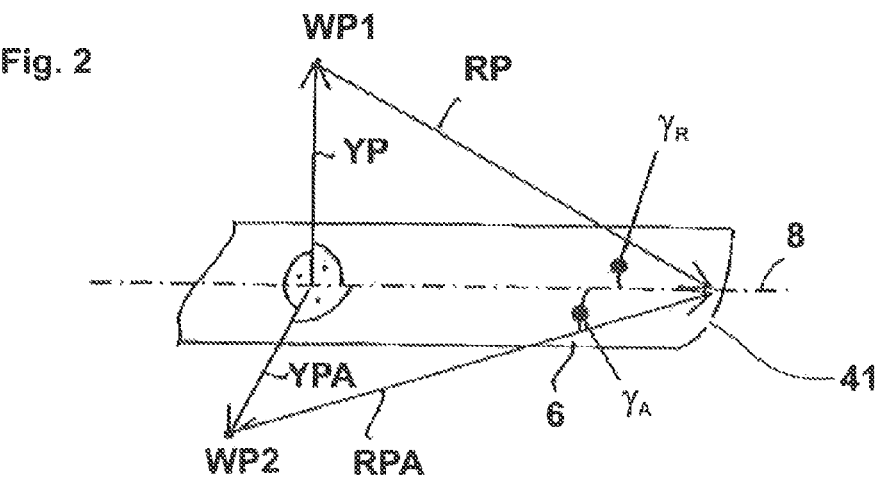
FIG. 2 is a schematic illustration for explaining the contour of the cradle thrust pieces.

FIG. 2 shows a sketch of the contour of the cradle thrust pieces 6. These have, on their end surfaces 41, a convex, rounded surface. The curvature of the rounded surface of the cradle thrust pieces 6 is defined by a first cradle thrust radius RP and a second cradle thrust radius RPA. The first cradle thrust radius RP is measured from a first point WP1 which is spaced apart, correspondingly to a first eccentricity YP, from the longitudinal axis 8 of the cradle thrust pieces by a first distance running perpendicular to the longitudinal axis 8. The second cradle thrust radius RPA running in the azimuthal direction is measured from a second point WP2 which is spaced apart, corresponding to a second eccentricity YPA, from the longitudinal axis 8 of the cradle thrust pieces by a second distance running perpendicular to the longitudinal axis 8 and furthermore perpendicular to the first distance YP. The end surface 41 thus has an angle γR in the radial direction and, perpendicular thereto, an angle γA in the azimuthal direction. Said angle is different for different points on the surface of the end surfaces 41, and is defined by a tangential surface applied at the respective point.

FIG. 2 shows the contour, which is coordinated with said disk set contour of the fixed disk 1 and of the movable disk 2, of the cradle thrust pieces 6 of the chain arrangement 5. Here, the curvature of the cradle thrust pieces 6 is defined by a first cradle thrust radius RP and by a second cradle thrust radius RPA. The first cradle thrust radius RP is measured from a first point WP1 which is spaced apart, corresponding to a first eccentricity YP, from the longitudinal axis 8 of the cradle thrust pieces 6 by a first distance running perpendicular to the longitudinal axis 8. The second cradle thrust radius RPA running in the azimuthal direction is measured from a second point WP2 which is spaced apart, corresponding to a second eccentricity YPA, from the longitudinal axis 8 of the cradle thrust pieces by a second distance running perpendicular to the longitudinal axis 8 and furthermore perpendicular to the first distance.

The table 1 below shows combinations of the disk sets with cradle thrust pieces 6 which have been found to be advantageous. In variants (3) and (4), the geometry of the drive input disk set 10 and of the drive output disk set 20 may also be interchanged.

Variant (1) is prior art and has been listed for comparison. The radial angle γR of the cradle thrust pieces 6 is in this case 10.1°. The fixed disks and the movable disks of the drive input and drive output disk sets 10, 20 have identical radii. RS1 and RS2 of in each case 5000 mm, and an identical eccentricity YS1, YS2 of 760 mm. In variant (2), the same disk sets as in variant (1) are used, but in this case the radial angle γR of the cradle thrust pieces 6 is 97°. The contact between the cradle thrust pieces 6 and the disk pair composed of fixed disk 1 and movable disk 2 is better in variant (2) than in variant (1), but this comes at the expense of impaired acoustics.

If variant (1) is taken as a basis (chain with cradle thrust pieces with γR=10.1° on disk sets YS1=760 mm at the drive input disk set and YS2=760 mm at the drive output disk set), then with the 10.1° chain, all disk set variants with an eccentricity of between YS=760 mm and YS=795 mm (at the drive input and/or at the drive output) offer an advantage with regard to durability and a disadvantage with regard to acoustics.

Variants (3) and (4) are examples of a compromise between the contact of the cradle thrust pieces 6 against the disk pair and the acoustics. In variant (3), a cradle thrust piece is used which has a radial angle γR of 10.1°. The fixed disk 1 and the movable disk 2 have the same radius RS1, RS2 of 5000 mm. The eccentricities YS1 and YS2 are different and are YS1=760 mm for the fixed disk and the movable disk of the drive input disk set 10, and YS2=795 mm for the fixed disk and the movable disk of the drive output disk set 20. The contact of the cradle thrust pieces 6 against the disk pair is in this case similar to variant (2), while the acoustic properties lie between those obtained with variants (1) and (2).

In variant (4), a cradle thrust piece is used which has a radial angle γR of 9.7°. The disk sets 10, 20 have the same radius RS1, RS2 of 5000 mm. The eccentricities YS1 and YS2 are different and are YS1=725 for the fixed disk and the movable disk of the drive input disk set 10, and YS2=760 for the fixed disk and the movable disk of the drive output disk set 20. The contact of the cradle thrust pieces 6 against the disk pair is in this case again similar to variant (2), while the acoustic properties again lie between those obtained with variants (1) and (2).

TABLE 1

| Variant | Cradle thrust piece 6 γR[°] | Drive input disk set 10 | | Drive output disk set 20 | |
|---|---|---|---|---|---|
| | | RS1 [mm] | YS1 [mm] | RS2 [mm] | YS2 [mm] |
| (1) | 10 1 | 5000 | 760 | 5000 | 760 |
| (2) | 9.7 | 5000 | 760 | 5000 | 760 |
| (3) | 10.1 | 5000 | 760 | 5000 | 795 |
| (4) | 9.7 | 5000 | 725 | 5000 | 760 |

In the drive input disk set 10 of variant (3) and the drive output disk set 20 of variant (4) with a radius RS1 and RS2 of 5000 mm and an eccentricity YS1 and YS2 of 760 mm, the values for RS and YS may be varied in further embodiments. The indices 1 and 2 have hereinafter been omitted for better legibility. In further exemplary embodiments, the radius RS lies in the range from 4000 mm to 6000 mm, and the eccentricity YS lies in the range from 755 mm to 765 mm. Here, the ratio YS/RS is kept in the range 0.145 to 0.2.

The parameters RS and YS of the drive output disk set 20 in variant (3) (in this case, the fixed and movable disks of the drive output disk set 20 have a radius RS of 5000 turn and an eccentricity YS of 795 mm) may likewise be varied. In further exemplary embodiments, the radius RS lies in the range from 4000 mm to 6000 mm, and the eccentricity YS lies in the range from 790 mm to 800 mm. Here, the ratio YS/RS is kept in the range 0.145 to 0.2. The stated values may also be used in the case of the fixed disk; the values YS and RS for the fixed disk 1 and for the movable disk 2 in table 1 would then be interchanged. The values RS and YS are varied for the fixed disk 1 rather than for the movable disk 2.

The parameters RS and YS of the fixed disk in variant (4) (said fixed disk has a radius RS of 5000 mm and an eccentricity YS of 725 mm) may likewise be varied. In further exemplary embodiments, the radius RS lies in the range from 4000 mm to 6000 mm, and the eccentricity YS lies in the range from 720 mm to 730 mm. Here, the ratio YS/RS is kept in the range 0.145 to 0.2.

The cradle thrust piece 6 with a radial angle γR of 10.1° (see variant (3)) has a first eccentricity YP of 35 mm with a first cradle thrust radius RP of 200 mm. The second eccentricity YPA is 0.42 mm with a second cradle thrust radius RPA of 80 mm. The ratio YP/RP lies in the range from 0.165 to 0.185, and the ratio YPA/RPA lies in the range 0 to 0.015.

The cradle thrust piece 6 with a radial angle γR of 9.7° (see variant (4)) has a first eccentricity YP of 33.7 mm with a first cradle thrust radius RP of 200 mm. The second eccentricity YPA is 0.42 mm with a second cradle thrust radius RPA of 80 mm. The ratio YP/RP lies in the range from 0.159 to 0.179, and the ratio YPA/RPA lies in the range 0 to 0.015.

Acoustic measurements of the variants on an acoustics test bed have confirmed the advantageous effect of the invention with regard to acoustic properties and wear.

LIST OF REFERENCE SYMBOLS

1 Fixed Disk
2 Movable Disk
3 Axis of Rotation
4 Drive Input Shaft
5 Chain Arrangement
6 Cradle Thrust Piece
7 Line
8 Longitudinal Axis
9 Pressure Chambers
10 Drive Input Disk Set
12 Hydraulic Line
13 Hydraulic Line
14 Control Valve Unit
15 Control Unit
20 Drive Output Disk Set
21 Fixed Disk
22 Conical Disk
40 Drive Output Shaft
41 End Surface
42 Friction Surface
YS Eccentricity
RS Disk Set Radius
YP Eccentricity
RP Cradle Piece Radius
YPA Eccentricity
RPA Cradle Piece Radius
SP1 Point WP1 Point
WP2 Point
γR Radial Angle
γA Azimuthal Angle

What is claimed:

1. A disk set arrangement for a chain-type CVT, comprising:
an input disk set rotatable about an input axis of rotation, the input disk set having an input shaft rotatable about the input axis of rotation and two input disks movable axially relative to one another on the input shaft, the two input disks having friction surfaces;
an output disk set rotatable about an output axis of rotation, the output disk set having an output shaft rotatable about the output axis of rotation and two output disks movable axially relative to one another on the output shaft, the two output disks having friction surfaces; and
a chain arrangement with cradle thrust pieces, one of the cradle thrust pieces acting between the input disks and the other of the cradle thrust pieces acting between the output disks, the cradle thrust pieces each having a longitudinal axis which runs parallel to the input axis of rotation and the output axis of rotation, respectively,
wherein a cross section of each of the friction surfaces of the input disks through the input shaft has a curvature defined by a radius with a center offset from the input axis of rotation by a distance, wherein the distance is an eccentricity,
wherein a cross section of each of the friction surfaces of the output disks through the output shaft has a curvature defined by a radius with a center offset from the output axis of rotation by a distance, wherein the distance is an eccentricity,
wherein the eccentricity of the input disks differs from the eccentricity of the output disks; and
wherein the curvature of the disks of at least one of the input disk set and the output disk set is defined by a ratio between the eccentricity of the curvature of the disks of the at least one of the input disk set and the output disk set and the radius of the disks of the at least one of the input disk set and the output disk set, which ratio lies in a range of 0.145 to 0.20, thereby optimizing both acoustic properties and contact between the cradle thrust pieces and the input disk set and the output disk set.

2. The disk set arrangement as claimed in claim 1, wherein each of the cradle thrust pieces have a convex rounded end surface, a first cross section of the end surface through the longitudinal axis of the each of the cradle thrust pieces in a radial direction has a first curvature with a first cradle thrust piece radius and a second cross section of the end surface through the longitudinal axis of the each of the cradle thrust pieces has a second curvature with a second cradle thrust piece radius, the second cross section being perpendicular to the first cross section, the first cradle thrust piece radius having a center offset from the longitudinal axis by a first distance perpendicular to the longitudinal axis and the second cradle thrust piece radius having a center offset from the longitudinal axis by a second distance perpendicular to the longitudinal axis, a first ratio between the first distance and the first cradle thrust piece radius lies in a range of 0.165 to 0.185, and a second ratio between the second distance and the second cradle thrust piece radius lies in a range of 0 to 0.015.

3. The disk set arrangement as claimed in claim 2, wherein the first distance is about 35 mm and the first thrust piece radius is about 200 mm.

4. The disk set arrangement as claimed in claim 2, wherein the second distance is about 0.42 mm and the second thrust piece radius is about 80 mm.

5. The disk set arrangement as claimed in claim 1, wherein each of the cradle thrust pieces have a convex rounded end surface, a first cross section of the end surface through the longitudinal axis of the each of the cradle thrust pieces in a radial direction has a first curvature with a first cradle thrust piece radius and a second cross section of the end surface through the longitudinal axis of the each of the cradle thrust pieces has a second curvature with a second cradle thrust piece radius, the second cross section being perpendicular to the first cross section, the first cradle thrust piece radius having a center offset from the longitudinal axis by a first distance perpendicular to the longitudinal axis and the second cradle thrust piece radius having a center offset from the longitudinal axis by a second distance perpendicular to the longitudinal axis, a first ratio between the first distance and the first cradle thrust piece radius lies in a range of 0.159 to 0.179, and a second ratio between the second distance and the second cradle thrust piece radius lies in a range of 0 to 0.015.

6. The disk set arrangement as claimed in claim 5, wherein the first distance is about 33.7 mm and the first cradle piece radius is about 200 mm.

7. The disk set arrangement as claimed in claim 5, wherein the second distance is about 0.42 mm and the second cradle piece radius is about 80 mm.

8. The disk set arrangement as claimed in claim 1, wherein an eccentricity of the curvature of a first disk of one of the input disks or one of the output disks lies in a range of 755 mm to 765 mm and an eccentricity of the curvature of a second disk of the one of the input disks or the output disks lies in a range of 790 mm to 800 mm.

9. The disk set arrangement as claimed in claim 1, wherein the eccentricity of the curvature of a first disk of one of the input disks or one of the output disks lies in a range of 755 mm to 765 mm and the eccentricity of the disk curvature of a second disk of the one of the input disks or the output disks lies in a range of 720 mm to 730 mm.

10. The disk set arrangement as claimed in claim 1, wherein the radius of each of the input disks and the output disks is between 4000 mm and 6000 mm.

* * * * *